United States Patent
Bromand et al.

(10) Patent No.: US 11,094,319 B2
(45) Date of Patent: Aug. 17, 2021

(54) SYSTEMS AND METHODS FOR GENERATING A CLEANED VERSION OF AMBIENT SOUND

(71) Applicant: Spotify AB, Stockholm (SE)

(72) Inventors: Daniel Bromand, Boston, MA (US); Richard Mitic, Stockholm (SE); Björn Erik Roth, Stockholm (SE)

(73) Assignee: Spotify AB, Stockholm (SE)

( * ) Notice: Subject to any disclaimer, the term of this patent is extended or adjusted under 35 U.S.C. 154(b) by 150 days.

(21) Appl. No.: 16/557,734

(22) Filed: Aug. 30, 2019

(65) Prior Publication Data

US 2021/0065696 A1 Mar. 4, 2021

(51) Int. Cl.
| | |
|---|---|
| *G10L 15/20* | (2006.01) |
| *G06F 3/16* | (2006.01) |
| *G10L 15/22* | (2006.01) |
| *G10L 25/84* | (2013.01) |

(52) U.S. Cl.
CPC .............. *G10L 15/20* (2013.01); *G06F 3/165* (2013.01); *G10L 15/22* (2013.01); *G10L 25/84* (2013.01); *G10L 2015/223* (2013.01)

(58) Field of Classification Search
CPC ......... G10L 15/20; G10L 15/22; G10L 25/84; G10L 2015/223; G06F 3/165
See application file for complete search history.

(56) References Cited

U.S. PATENT DOCUMENTS

| | | | |
|---|---|---|---|
| 9,319,782 | B1 | 4/2016 | Crump et al. |
| 9,431,021 | B1 | 8/2016 | Scalise et al. |
| 9,640,179 | B1 * | 5/2017 | Hart .................. G10L 15/20 |
| 9,794,710 | B1 * | 10/2017 | Sheen ................ G06F 3/162 |
| 9,916,839 | B1 | 3/2018 | Scalise et al. |
| 9,940,949 | B1 | 4/2018 | Vitaladevuni et al. |

(Continued)

FOREIGN PATENT DOCUMENTS

| | | |
|---|---|---|
| CN | 108847219 A | 11/2018 |
| CN | 109741755 A | 5/2019 |

(Continued)

OTHER PUBLICATIONS

Bromand, Notice of Allowance, dated Jun. 29, 2020, 9 pgs.

(Continued)

*Primary Examiner* — Mohammad K Islam
(74) *Attorney, Agent, or Firm* — Morgan, Lewis & Bockius LLP

(57) ABSTRACT

While a media content item is emitted by a second electronic device that is remote from the first electronic device, the first electronic device receives data that includes: timing information, offset information that indicates a difference between an initial position of the media content item and a current playback position of the media content item, and an audio stream that corresponds to the media content item. The first electronic device detects ambient sound that includes sound corresponding to the media content item emitted by the second electronic device. The first electronic device generates a cleaned version of the ambient sound by using the timing information and the offset information to align the audio stream with the ambient sound and performing a subtraction operation to substantially subtract the audio stream from the ambient sound.

19 Claims, 7 Drawing Sheets

(56) References Cited

U.S. PATENT DOCUMENTS

| | | |
|---|---|---|
| 9,947,333 B1 | 4/2018 | David |
| 10,074,371 B1 | 9/2018 | Wang et al. |
| 10,192,546 B1 | 1/2019 | Piersol et al. |
| 10,283,116 B2 | 5/2019 | Ko et al. |
| 10,297,266 B1 | 5/2019 | Burenius et al. |
| 10,304,475 B1 | 5/2019 | Wang et al. |
| 2013/0013315 A1 | 1/2013 | Burke et al. |
| 2014/0254816 A1 | 9/2014 | Kim et al. |
| 2015/0162006 A1 | 6/2015 | Kummer |
| 2015/0331666 A1 | 11/2015 | Bucsa et al. |
| 2016/0307570 A1 | 10/2016 | Mizumoto et al. |
| 2017/0069321 A1 | 3/2017 | Toiyama |
| 2018/0012593 A1 | 1/2018 | Prasad et al. |
| 2018/0122378 A1 | 5/2018 | Mixter et al. |
| 2018/0165055 A1* | 6/2018 | Yu .................... H04L 65/60 |
| 2018/0190264 A1 | 7/2018 | Mixter et al. |
| 2018/0211666 A1 | 7/2018 | Kolavennu et al. |
| 2018/0233136 A1 | 8/2018 | Torok et al. |
| 2018/0233137 A1 | 8/2018 | Torok et al. |
| 2018/0286433 A1 | 10/2018 | Hicks et al. |
| 2019/0074014 A1 | 3/2019 | Wilberding |
| 2019/0096419 A1 | 3/2019 | Giacobello |
| 2019/0251960 A1 | 8/2019 | Maker et al. |
| 2019/0320260 A1 | 10/2019 | Alders et al. |
| 2019/0355365 A1 | 11/2019 | Kim et al. |
| 2020/0074995 A1* | 3/2020 | Rosenberg ....... G10K 11/17837 |
| 2020/0357374 A1* | 11/2020 | Verweij .................. H04S 7/304 |
| 2020/0367006 A1* | 11/2020 | Beckhardt ................ H04R 1/26 |
| 2020/0374269 A1* | 11/2020 | Lidman .................. G10L 15/30 |
| 2020/0402490 A1* | 12/2020 | Duthaler ............ G10L 21/0208 |

FOREIGN PATENT DOCUMENTS

| | | |
|---|---|---|
| DK | 201770421 A1 | 12/2018 |
| EP | 2965496 A1 | 1/2016 |
| EP | 2965496 B1 | 1/2018 |
| EP | 3306892 A1 | 4/2018 |
| WO | WO2017/197184 A1 | 11/2017 |
| WO | WO2018/211983 A1 | 11/2018 |
| WO | WO2018/236952 A1 | 12/2018 |
| WO | WO2019034083 A1 | 2/2019 |
| WO | WO2019046173 A1 | 3/2019 |
| WO | WO2019/160787 A1 | 8/2019 |

OTHER PUBLICATIONS

Spotify AB, Extended European Search Report, EP20170208.1, dated Oct. 9, 2020, 6 pgs.

Spotify AB, Extended European Search Report, EP20178734.8, dated Nov. 26, 2020, 10 pgs.

Spotify AB, Extended European Search Report, EP20179016.9, dated Aug. 14, 2020, 7 pgs.

Bingham, "A fast fixed-point algorithm for independent component analysis of complex valued signals," Neural Networks Research Centre, Helsinki University of Technology, Finland, Jan. 19, 2000, 16 pgs.

E&T Engineering and Technology, "Amazon proposes bundling multiple virtual assistants in a single device," Sep. 25, 2019, downloaded from https://eandt.theiet.org/content/articles/2019/amazon-proposes-bundling-multiple-virtual-assistnts-in-a-single-device/, 4 pgs.

Saruwatari, "Blind Source Separation Combining Independent Component analysis and Beamforming," EURASIP Journal on Applied Signal Processing 2003:11, 1135-1146, © 2003 Hindawi Publishing Corporation, 12 pgs.

\* cited by examiner

SYSTEMS AND METHODS FOR GENERATING A CLEANED VERSION OF AMBIENT SOUND

TECHNICAL FIELD

The disclosed embodiments relate generally to media playback, and, in particular, to subtracting audio from detected ambient sound.

BACKGROUND

Access to electronic media, such as music and video content, has expanded dramatically over time. As a departure from physical media, media content providers stream media to electronic devices across wireless networks, improving the convenience with which users can digest and experience such content.

Some devices are enabled to receive voice commands as a means of controlling media playback. When two or more devices are in proximity with each other, the device receiving the voice commands may also receive audio output, such as a media item, that is playing on the other device. Thus, the audio output from a second device can make it more challenging for a first device to accurately identify and interpret voice commands.

SUMMARY

There is a need for systems and methods of generating a cleaned version of ambient sound such that voice commands and/or wake words can be identified at a first device, even while media content is played back at a second device. For example, when the second device is located close to the first device, the media content that is played back at the second device contributes to ambient sound that is picked up by the first device. The first device generates a cleaned version of the ambient sound so that the cleaned version can be analyzed and voice commands received by the first device can be detected and identified. In some embodiments, the first device tracks the media content that is played back at the second device so that the first device is enabled to subtract audio signals produced by the media content playing on the second device from the ambient sound that is detected at the first device. Subtracting audio signals produced by media content playing on a second device from sound detected at a first device improves detection of voice commands by the first device. Improving detection of voice commands reduces incorrect detection of voice commands or missed detection of voice commands, which in turn reduces the amount of processing power required for detecting and interpreting voice commands. By improving the accuracy of detecting voice commands (e.g., as inputs from a user), the performance of the device is improved by allowing faster recognition of the inputs and reducing the processing load of the device when performing recognition.

In accordance with some embodiments, a method is performed at a first electronic device. The first electronic device has one or more processors and memory storing instructions for execution by the one or more processors. The method includes, while a media content item is emitted by a second electronic device that is remote from the first electronic device, receiving data that includes: timing information, offset information that indicates a difference between an initial position of the media content item and a current playback position of the media content item, and an audio stream that corresponds to the media content item. The method also includes detecting ambient sound that includes sound corresponding to the media content item emitted by the second electronic device and generating a cleaned version of the ambient sound, including using the timing information and the offset information to align the audio stream with the ambient sound and performing a subtraction operation to substantially subtract the audio stream from the ambient sound.

In some embodiments, the timing information includes a clock signal. In some embodiments, the timing information includes an indication of latency between the second electronic device and the first electronic device.

In some embodiments, the offset information includes an indication of a time duration between the initial position of the media content item and the current playback position of the media content item.

In some embodiments, the offset information includes an indication of a data amount that corresponds to the difference between the initial position of the media content item and the current playback position of the media content item.

In some embodiments, the timing information is received from the second electronic device.

In some embodiments, the timing information is received from a first server.

In some embodiments, the offset information is received from the second electronic device.

In some embodiments, the offset information is received from a first server.

In some embodiments, the audio stream has a lower data rate than the media content item stream that is provided to the second electronic device.

In some embodiments, the audio stream is received from the second electronic device.

In some embodiments, the audio stream is received from a first server. In some embodiments, the audio stream is received from a second server distinct from a first server.

In some embodiments, the timing information is embedded in the audio stream.

In some embodiments, the method includes analyzing the cleaned version of the ambient sound to determine whether a command is present in the ambient sound.

In some embodiments, the first electronic device is not playing the media content item.

In some embodiments, the first electronic device is playing the media content item.

In accordance with some embodiments, a first electronic device (e.g., a server system, a client device, etc.) includes one or more processors and memory storing one or more programs configured to be executed by the one or more processors. The one or more programs include instructions for, while a media content item is emitted by a second electronic device that is remote from the first electronic device, receiving data that includes: timing information, offset information that indicates a difference between an initial position of the media content item and a current playback position of the media content item, and an audio stream that corresponds to the media content item. The one or more programs also include instructions for detecting ambient sound that includes sound corresponding to the media content item emitted by the second electronic device and generating a cleaned version of the ambient sound, including using the timing information and the offset information to align the audio stream with the ambient sound and performing a subtraction operation to substantially subtract the audio stream from the ambient sound.

In accordance with some embodiments, a computer-readable storage medium has stored therein instructions that, when executed by an electronic device, cause the first electronic device to, while a media content item is emitted by a second electronic device that is remote from the first electronic device, receive data that includes: timing information, offset information that indicates a difference between an initial position of the media content item and a current playback position of the media content item, and an audio stream that corresponds to the media content item. The instructions further cause the first electronic device to detect ambient sound that includes sound corresponding to the media content item emitted by the second electronic device and generate a cleaned version of the ambient sound, including using the timing information and the offset information to align the audio stream with the ambient sound and performing a subtraction operation to substantially subtract the audio stream from the ambient sound.

Thus, systems are provided with improved methods for providing information associated with media content items based on a proxy media content item.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
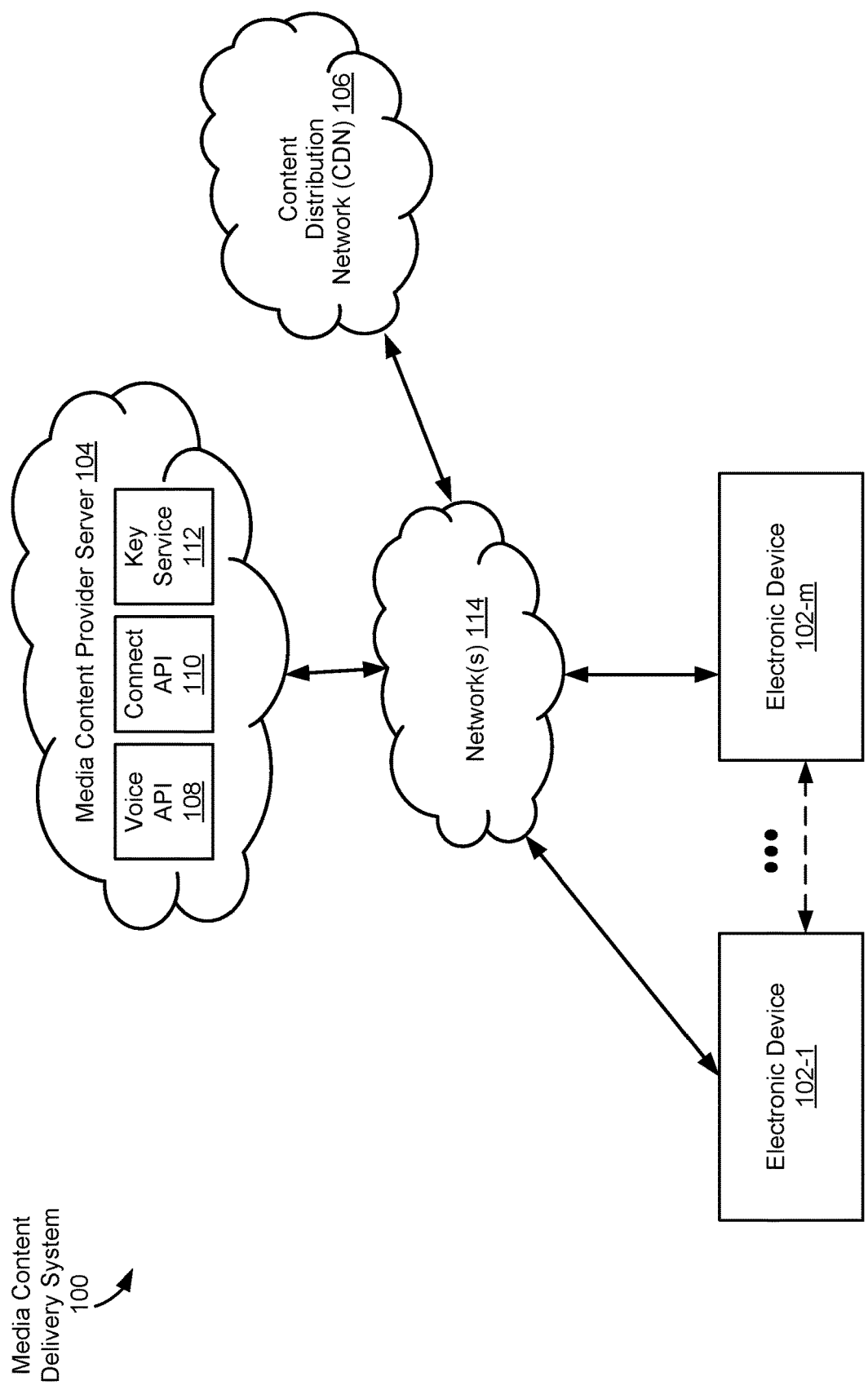
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-*m*, where m is an integer greater than one), one or more media content provider servers 104, and/or one or more content delivery networks (CDNs) 106. The one or more media content provider servers 104 are associated with (e.g., at least partially compose) a media-providing service. The one or more CDNs 106 store and/or provide one or more content items (e.g., to electronic devices 102). In some embodiments, the one or more CDNs 106 are associated with the media-providing service. In some embodiments, the CDNs 106 are included in the media content provider servers 104. One or more networks 114 communicably couple the components of the media content delivery system 100. In some embodiments, the one or more networks 114 include public communication networks, private communication networks, or a combination of both public and private communication networks. For example, the one or more networks 114 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-*m* are the same type of device (e.g., electronic device 102-1 and electronic device 102-*m* are both speakers). Alternatively, electronic device 102-1 and electronic device 102-*m* include two or more different types of devices. In some embodiments, electronic device 102-1 (e.g., or electronic device 102-2) includes a plurality (e.g., a group) of electronic devices. For example, electronic device 102-2 comprises two or more speakers (e.g., or a combination of two or more electronic devices, such as a speaker, a TV, and a smart phone). In some embodiments, the two or more speakers are communicatively coupled to each other (e.g., to synchronize playback over the two or more speakers).

In some embodiments, electronic devices 102-1 and 102-*m* send and receive media-control information through network(s) 114. For example, electronic devices 102-1 and 102-*m* send media control requests (e.g., requests to play music, movies, videos, or other media items, or playlists thereof) to media content provider server 104 through network(s) 114. Additionally, electronic devices 102-1 and 102-*m*, in some embodiments, also send indications of media content items to media content provider server 104 through network(s) 114. In some embodiments, the media content items are uploaded to electronic devices 102-1 and 102-*m* before the electronic devices forward the media content items to media content provider server 104.

In some embodiments, electronic device 102-1 communicates directly with electronic device 102-*m* (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-*m*. In some embodiments, electronic device 102-1 communicates with electronic device 102-*m* through network(s) 114. In some embodiments, electronic device 102-1 uses the direct connection with electronic device 102-*m* to stream content (e.g., data for media items) for playback on the electronic device 102-*m*.

In some embodiments, electronic device 102-1 and/or electronic device 102-*m* include a media application 222 (FIG. 2) that allows a respective user of the respective electronic device to upload (e.g., to media content provider server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content provider server 104). In some embodiments, the electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, and/or an infotainment system of a vehicle). In some embodiments, the CDN 106 sends media content to the electronic device(s) 102. In some embodiments, the CDN 106 sends media content to the electronic device(s) 102 in response to receiving a request (e.g., from one or more electronic device(s) 102 and/or from media content provider server 104).

In some embodiments, the CDN 106 stores and provides media content (e.g., media content requested by the media application 222 of electronic device 102) to electronic device 102 via the network(s) 114. Content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content provider server 104 receives media requests (e.g., commands) from electronic devices 102. In some embodiments, media content provider server 104 includes a voice API 108 (e.g., voice recognition module 316, FIG. 3), a connect API 110 (e.g., Network Communication Module 312, FIG. 3), and/or key service 112 (e.g., key database 336, FIG. 3). In some embodiments, media content provider server 104 validates (e.g., using key service) electronic devices 102 by exchanging one or more keys (e.g., tokens) with electronic device(s) 102.

In some embodiments, media content provider server 104 and/or CDN 106 stores one or more playlists (e.g., information indicating a set of media content items). For example, a playlist is a set of media content items defined by a user and/or defined by an editor associated with a media-providing service. The description of the media content provider server 104 as a "server" is intended as a functional description of the devices, systems, processor cores, and/or other components that provide the functionality attributed to the media content provider server 104. It will be understood that the media content provider server 104 may be a single server computer, or may be multiple server computers. Moreover, the media content provider server 104 may be coupled to CDN 106 and/or other servers and/or server systems, or other devices, such as other client devices, databases, content delivery networks (e.g., peer-to-peer networks), network caches, and the like. In some embodiments, the media content provider server 104 is implemented by multiple computing devices working together to perform the actions of a server system (e.g., cloud computing).

Figure 2:
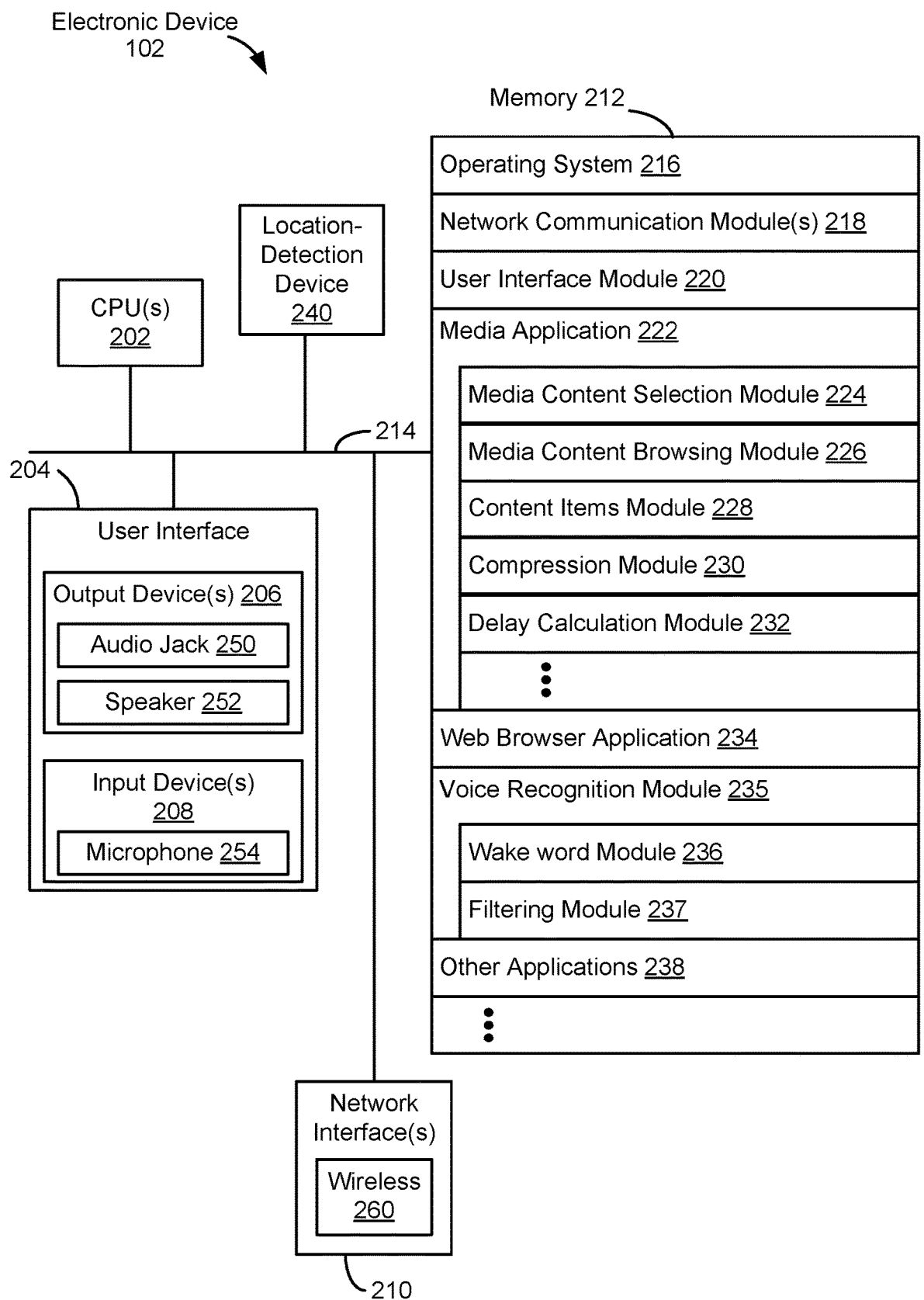
FIG. 2 is a block diagram illustrating a client device, in accordance with some embodiments.

FIG. 2 is a block diagram illustrating an electronic device 102 (e.g., electronic device 102-1 and/or electronic device 102-*m*, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone 254) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content provider server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, and/or or other wireless (e.g., Bluetooth-compatible) devices (e.g., for streaming audio data to the electronic device 102 of an automobile). Furthermore, in some embodiments, the wireless interface 260 (or a different communications interface of the one or more network interfaces 210) enables data communications with other WLAN-compatible devices (e.g., electronic device(s) 102) and/or the media content provider server 104 (via the one or more network(s) 114, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

an operating system 216 that includes procedures for handling various basic system services and for performing hardware-dependent tasks;

network communication module(s) 218 for connecting the electronic device 102 to other computing devices (e.g., other electronic device(s) 102, and/or media content provider server 104) via the one or more network interface(s) 210 (wired or wireless) connected to one or more network(s) 114;

a user interface module 220 that receives commands and/or inputs from a user via the user interface 204 (e.g., from the input devices 208) and provides outputs for playback and/or display on the user interface 204 (e.g., the output devices 206);

a media application 222 (e.g., an application for accessing a media-providing service of a media content provider associated with media content provider server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content provider server 104) data associated with user behavior. In some embodiments, media application 222 also includes the following modules (or sets of instructions), or a subset or superset thereof:

a media content selection module 224 for selecting one or more media content items and/or sending, to the media content provider server, an indication of the selected media content item(s);

a media content browsing module 226 for providing controls and/or user interfaces enabling a user to navigate, select for playback, and otherwise control or interact with media content, whether the media content is stored or played locally or remotely;

a content items module 228 for processing uploaded media items and storing media items for playback and/or for forwarding to the media content provider server;

a compression module 230 for compressing and/or decompressing media content; and a delay calculation module 232 for sending, receiving and/or tracking a delay (e.g., latency) between electronic device 102 and other electronic device(s), and/or for receiving and tracking timing information (e.g., from media content provider server 104).

a web browser application 234 (e.g., Internet Explorer or Edge by Microsoft, Firefox by Mozilla, Safari by Apple, and/or Chrome by Google) for accessing, viewing, and/or interacting with web sites;

a voice recognition module 235 for identifying and/or interpreting one or more voice commands received at the electronic device 102, the voice recognition module 235 including, but not limited to, one or more of:

a wake word module 236 for determining whether a wake word has been received at the electronic device 102, the wake word used to identify a voice command that follows the wake word (e.g., after the wake word is received, the electronic device records additional voice commands); and a filtering module 237 for performing a subtraction of audio to reduce and/or eliminate ambient noise to generate a clean version of a voice command received at the electronic device; and other applications 238, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
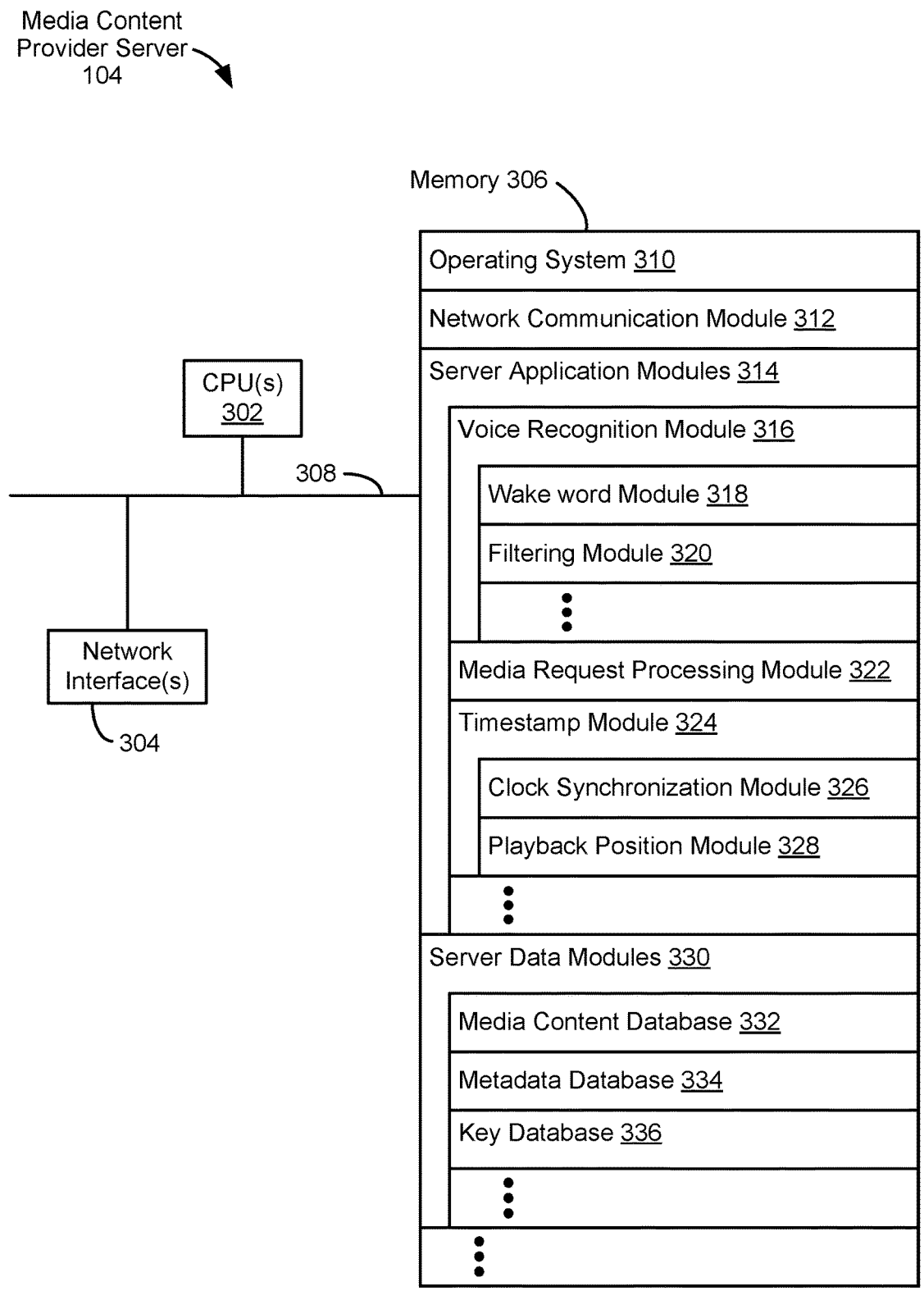
FIG. 3 is a block diagram illustrating a media content provider server, in accordance with some embodiments.

FIG. 3 is a block diagram illustrating a media content provider server 104, in accordance with some embodiments. The media content provider server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content provider server 104 to other computing devices via one or more network interfaces 304 (wired or wireless) connected to one or more networks 114;

one or more server application modules 314 for performing various functions with respect to providing and managing a content service, the server application modules 314 including, but not limited to, one or more of:

a voice recognition module 316 (e.g., executed as Voice API 108, FIGS. 1 and 4-5) for identifying and/or interpreting one or more voice commands received at an electronic device, the voice recognition module 316 including, but not limited to, one or more of:

a wake word module 318 for verifying and/or determining whether a wake word has been received at the electronic device, the wake word used to identify a voice command that follows the wake word (e.g., after the wake word is received, the electronic device records additional voice commands); and a filtering module 320 for performing a subtraction of audio to reduce and/or eliminate ambient noise to generate a clean version of a voice command received at the electronic device; and a media request processing module 322 for processing requests for media content and facilitating access to requested media items by electronic devices (e.g., the electronic device 102) including, optionally, streaming media content to such devices;

a timestamp module 324 for providing indications of timing (e.g., of current time and/or timing related to playback of a media content item), including, but not limited to, one or more of:

a clock synchronization module 326 for generating and/or sending, to an electronic device, a clock synchronization signal or other timing information; and a playback position module 328 for processing (e.g., identifying and/or providing to the electronic device) timing information related to playback of a media content item;

one or more server data module(s) 330 for handling the storage of and/or access to media items and/or metadata relating to the media items; in some embodiments, the one or more server data module(s) 330 include:

a media content database 332 for storing media items;

a metadata database 334 for storing metadata relating to the media items; and a key database 336 for storing keys related to account information for user media accounts, such as user profiles, credentials (e.g., user identifiers, passwords, email addresses, etc.), and/or identifiers of any linked accounts.

In some embodiments, the media content provider server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above. In some embodiments, memory 212 stores one or more of the above identified modules described with regard to memory 306. In some embodiments, memory 306 stores one or more of the above identified modules described with regard to memory 212.

Although FIG. 3 illustrates the media content provider server 104 in accordance with some embodiments, FIG. 3 is intended more as a functional description of the various features that may be present in one or more media content provider servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content provider server 104. The actual number of servers used to implement the media content provider server 104, and how features are allocated among them, will vary from one implementation to another and, optionally, depends in part on the amount of data traffic that the server system handles during peak usage periods as well as during average usage periods.

Figure 4:
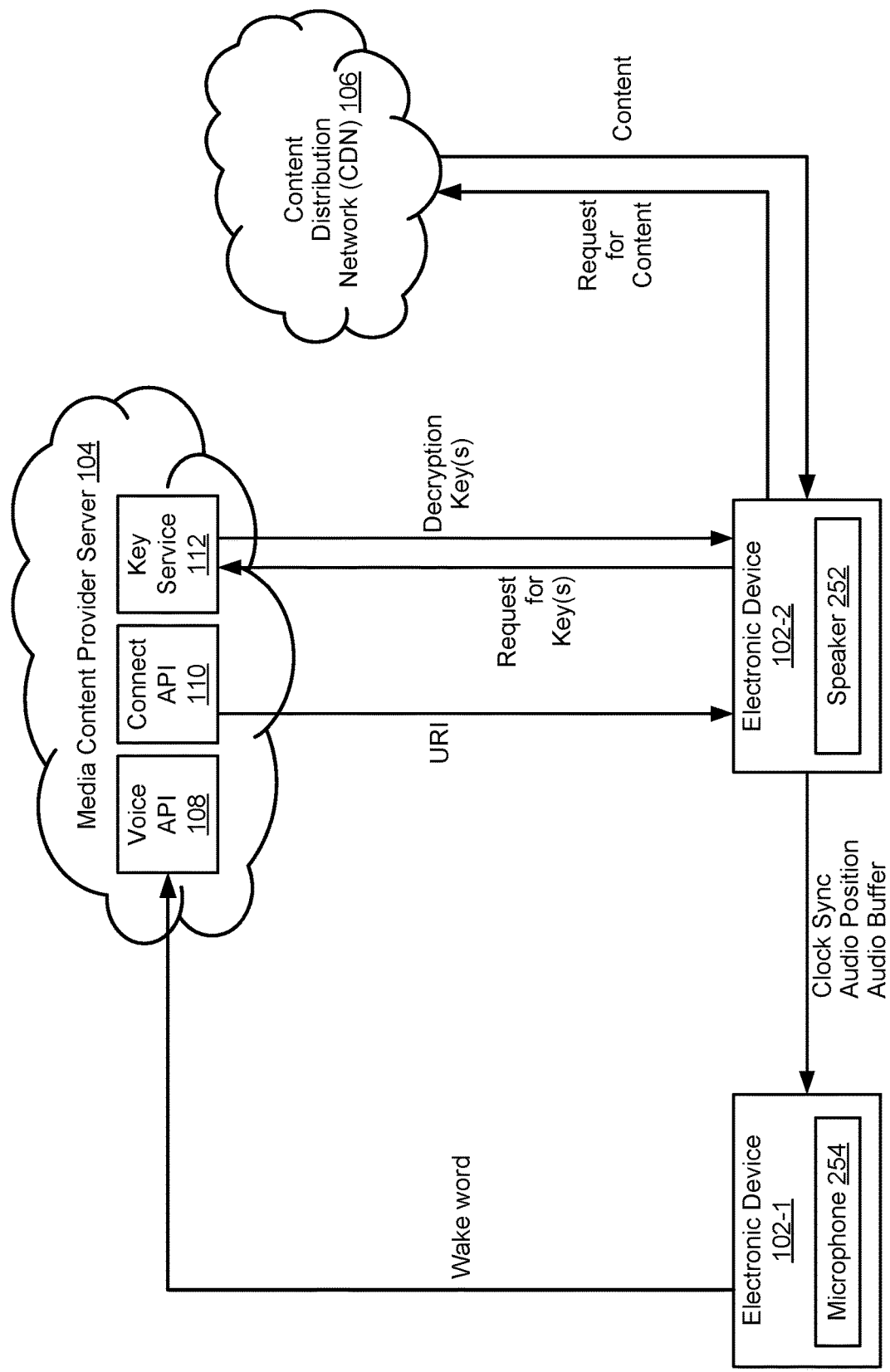
FIG. 4 is a block diagram illustrating a first system architecture for generating a cleaned version of ambient sound, in accordance with some embodiments.

FIG. 4 is a block diagram illustrating a first system architecture for generating a cleaned version of ambient sound, in accordance with some embodiments. In the illustrative example of FIG. 4, information (e.g., clock sync, audio position, and/or audio buffer) is received from electronic device 102-2 and used for subtracting audio corresponding to a media content item playing at electronic device 102-2 from a signal received by a microphone of electronic device 102-1.

In some embodiments, electronic device 102-1 receives, from electronic device 102-2, information about a media content item. Electronic device 102-1 uses the information to perform a subtraction on ambient sound picked up by microphone 254 such that the audio signals output from electronic device 102-2 are at least partially removed from the ambient sound picked up by microphone 254. After performing the subtraction, the detectability of a wake word and/or voice command uttered by a user of electronic device 102-1 is improved (e.g., detected with improved accuracy).

Electronic device 102-1 receives information associated with audio signals that are produced by electronic device 102-2, including: clock synchronization information, audio position information (e.g., the current playback position of media content playing back at electronic device 102-2), and an audio buffer (e.g., including data corresponding to media content that is playing back at electronic device 102-2). Electronic device 102-1 uses the received clock information and audio position information (current playback position) to calculate an offset between a first time at which media content that is playing back at electronic device 102-2 is output by electronic device 102-2 and a second time at which media content that is playing back at electronic device 102-2 is received by electronic device 102-1. Electronic device 102-1 uses the calculated offset to perform a subtraction, where the audio signal corresponding to the media content playing at electronic device 102-2 is subtracted from the audio signal received by the microphone of electronic device 102-1 (e.g., the ambient sound).

In some embodiments, electronic device 102-2 communicates (e.g., over network(s) 114) with media content provider server 104. For example, communications of electronic device 102-2 with media content provider server 104 use a "Connect API" 110 (e.g., Network Communication Module 312) and/or a "Key Service" 112 (e.g., Key Database 336). In some embodiments, media content provider server 104, using the Connect API 110, sends information, such as a uniform resource identifier (URI) to electronic device 102-2 to establish a connection between media content provider server 104 and electronic device 102-2. In some embodiments, electronic device 102-2 sends, to media content provider server 104, a request for one or more decryption key(s). In some embodiments, media content provider server 104 sends one or more decryption keys (from Key Service 112) to electronic device 102-2 to establish a secure communications channel between the media content provider server and the electronic device. In some embodiments, media content provider server 104 uses decryption keys to verify a user account associated with electronic device 102-2 (e.g., to authorize and/or provide access to media content received from CDN 106). In some embodiments, after connecting (e.g., via URI) with media content provider server 104, electronic device 102-2 is granted access to media content stored at CDN 106. For example, electronic device 102-2 is able to request and/or receive media content from CDN 106.

In some embodiments, electronic device 102-2 sends (via network(s) 114), to media content provider server 104 and/or CDN 106, a request for media content. In some embodiments, media content provider server 104 and/or CDN 106 determines whether electronic device 102-2 is authorized to access the media content. For example, electronic device 102-2 is authorized to access the media content after connecting (e.g., exchanging decryption keys) with media content provider server 104.

In response to receiving the request for media content and determining that the electronic device 102-2 is authorized, CDN 106 sends media content to the electronic device 102-2 for playback. In some embodiments, media content provider server 104 sends an instruction to CDN 106 to send the media content to electronic device 102-2.

In some embodiments, electronic device 102-2 is communicatively coupled (e.g., using network communication module(s) 218, FIG. 2) with electronic device 102-1. In some embodiments, electronic device 102-1 is a speaker (e.g., or other mobile device) that includes a microphone. In some embodiments, electronic device 102-2 is a speaker used to playback the content received from CDN 106.

In some embodiments, electronic device 102-1 and electronic device 102-2 perform a handshake to establish a communications channel between the electronic devices. In some embodiments, electronic device 102-1 and electronic device 102-2 exchange, over the communications channel, clock synchronization information (e.g., to match timing between the electronic devices), audio position information (e.g., representing a current playback position of a media content item), and/or audio buffer information (e.g., storing media content as chunks of data). For example, the clock synchronization information is transmitted to enable electronic device 102-1 to align a current time with electronic device 102-2 and/or establish a delay along a communication channel between electronic device 102-1 and electronic device 102-2. In some embodiments, electronic device 102-1 uses the clock synchronization information to determine a current real time (e.g., shared by electronic device 102-1 and 102-2) and uses the audio position information to calculate an offset between the electronic device 102-1 and 102-2. For example, the offset represents the difference from a first time at which a particular position in a media content item is emitted from a speaker 252 of electronic device 102-2 and a second time at which the particular position in the media content item is picked up by a microphone of electronic device 102-1. Using the calculated offset, the electronic device 102-1 performs a subtraction of the audio signals that are emitted by electronic device 102-2 (e.g., as represented by the data in the received audio buffer) from the ambient sound that electronic device 102-1 receives. In some embodiments, the electronic device 102-1 applies a filter on the subtracted audio signals in order to at least partially filter out the audio signal corresponding to the received media content item (e.g., as represented by the data in the audio buffer) from the signal picked up by the microphone of electronic device 102-1 (e.g., acoustic echo cancellation (AEC) is applied to the signal picked up by the microphone of electronic device 102-1). For example, electronic device 102-1 uses the calculated offset to align the audio buffer data in time with the audio signals emitted from electronic device 102-2 as included in the ambient sound received at electronic device 102-1.

In some embodiments, the audio position information comprises a current playback time (in milliseconds (ms)) measured from a beginning of the media content item that is presented at electronic device 102-2. For example, the audio position information represents how much time has passed since the start of presentation of the media content item. In some embodiments, the audio position information comprises a byte offset. For example, when a same version of media content is sent to both electronic devices, a byte offset representing a change in a size of data of the media content. In some embodiments, the byte offset is measured from a beginning (e.g., a full size) of the media content item.

In some embodiments, the audio buffer includes at least a portion of the media content item that is playing at electronic device 102-2. In some embodiments, the audio buffer includes an encrypted version of at least a portion of the media content item. In some embodiments, electronic device 102-1 decrypts the received encrypted audio buffer. The electronic device streams the audio buffer (e.g., the decrypted audio buffer) to a digital signal processor (e.g., CPU) of the electronic device 102-1. The electronic device 102-1 reduces the audio signal corresponding to the received media content item that is included in the signal (e.g., ambient sound) picked up by the microphone of electronic device 102-1. For example, electronic device uses the data from the audio buffer to apply a filter in order to at least partially filter out the audio signal corresponding to the received media content item (e.g., as represented by the data in the audio buffer) from the signal picked up by the microphone of electronic device 102-1 (e.g., acoustic echo cancellation (AEC) is applied to the signal picked up by the microphone of electronic device 102-1). In this way, the audio signal corresponding to the received media content item is attenuated, allowing a wake word and/or voice command to be more readily identified in the signal picked up by the microphone of electronic device 102-1.

For example, electronic device 102-1 uses the calculated offset to filter a signal associated with media content played back by electronic device 102-2 (at least partially) out of the ambient sound. In this context, AEC involves recognizing an emitted signal (e.g., the sound from electronic device 102-2) that appears with some delay in the received signal (e.g., the ambient sound that is detected by electronic device 102-1). The recognized emitted signal can be removed (e.g., at least partially) by subtracting it from the received signal. In some embodiments, a digital signal processor (e.g., of electronic device 102-1) is used to perform the subtraction. This allows electronic device 102-1 to generate a cleaned version of the ambient sound to make it easier to detect a wake word that may be present in the ambient sound. Using the cleaned version of the ambient sound improves the detection of user inputs (e.g., wake words and/or voice commands) by allowing electronic device 102-1 to perform a faster and/or more accurate recognition of the inputs, thus improving the technical performance of electronic device 102-1.

In some embodiments, electronic device 102-1 calculates a delay (e.g., using delay calculation module 232) of the communications channel over which electronic device 102-1 and electronic device 102-2 communicate. For example, the electronic device 102-1 uses the clock synchronization information received from the electronic device 102-2 to calculate the delay. In some embodiments, the handshake between the electronic devices is used to calculate the delay. In some embodiments, the delay calculation is performed periodically (e.g., to refresh and/or adapt a time delay over time). For example, the delay calculation is performed at intervals of 1 millisecond-1000 milliseconds, such as intervals of 10 milliseconds-100 milliseconds, e.g., every 64 ms. In some embodiments, the delay calculation is performed at fixed intervals. In some embodiments, the delay calculation is performed at a rate that varies with time. For example, a higher frequency of sampling is performed after the initial handshake, and the frequency of the sampling decreases over time. In some embodiments, after the initial handshake, the delay calculation is performed with a first frequency (e.g., every 10 ms) and, after a period of time has passed (e.g., a predetermined period of time, such as e.g., 2 minutes after the handshake is performed), the delay calculation is performed with a second frequency that is lower than the first frequency (e.g., the delay calculation is performed every 30 ms). In some embodiments, the delay calculation is performed with a periodicity determined using data obtained about a network connection (e.g., a network connection between electronic device 102-1 and 102-2) to maintain synchronization between the electronic devices.

In some embodiments, electronic device 102-2 presents (e.g., plays) media content received from CDN 106. In some embodiments, electronic device 102-1 receives (e.g., from electronic device 102-2) an audio position (e.g., timing information) of the media content that is presented at electronic device 102-2, but electronic device 102-1 does not present (e.g., playback) the media content. For example, electronic device 102-1 is aware of the media content that is playing at electronic device 102-2 such that electronic device 102-1 performs audio filtering (e.g., subtraction) of the audio from electronic device 102-2 and is better able to detect voice commands received at the electronic device 102-1.

In some embodiments, electronic device 102-1 also receives and plays media content that is the same as the media content that is presented at electronic device 102-2. In some embodiments, electronic device 102-1 synchronizes playback with electronic device 102-2 (e.g., such that both electronic devices 102-1 and 102-2 present the media content simultaneously).

In some embodiments, electronic device 102-2 compresses (e.g., using compression module 230) the media content received from CDN 106 and sends the compressed version of the media content to electronic device 102-1. For example, when electronic device 102-1 is not playing back the media content, the bandwidth required to send audio information related to the media content item to the electronic device 102-1 is reduced by sending a compressed version of the audio item. In some embodiments, the compressed version of the media content item comprises a lower bitrate than the uncompressed version of the media content item. Sending the compressed version of the audio item improves the performance of the system 100 because less bandwidth is used across the channel between the electronic device 102-2 and electronic device 102-1. In some embodiments, receiving a compressed version of the audio item improves the performance of electronic device 102-1 by reducing the processing load of the electronic device 102-1. For example, electronic device 102-1 selectively decodes only a portion (e.g., chunks) of the compressed version of the audio item instead of processing the uncompressed version of the media content item. In some embodiments, the electronic device 102-2 forwards the media content item (e.g., without performing compression) to electronic device 102-1.

In some embodiments, electronic device 102-1 uses the information about the media content item to subtract the media content item playing at electronic device 102-2 from the signal picked up by microphone 254 of electronic device 102-1, such that detectability of a wake word and/or voice command uttered by a user of electronic device 102-1 is improved (e.g., detected with improved efficiency and/or accuracy). For example, a microphone 254 of electronic device 102-1 picks up audio signals produced by electronic device 102-2 (e.g., while a wake word and/or voice command are uttered by a user of electronic device 102-1). Electronic device 102-1 receives information including clock synchronization information (e.g., calculated time delay), the audio position information (e.g., the current playback position), and the audio buffer (e.g., what media content is playing) associated with audio signals that are produced by electronic device 102-2. Electronic device 102-1 uses the received information to subtract the media content playing at electronic device 102-2 from the audio signal received by the microphone of electronic device 102-1 (e.g., by performing a subtraction). By subtracting (e.g., and filtering) media content playing at electronic device 102-2 from the audio signal received by the microphone 254 of electronic device 102-1, electronic device 102-1 creates a cleaned version of ambient sound detected by electronic device 102-1 (e.g., the media content playing at electronic device 102-2 is at least partially removed from the sound picked up by the microphone 254 of electronic device 102-1). The cleaned version of the ambient sound is analyzed to determine wake words and/or voice commands. In this way, determination of wake words and/or voice commands received by microphone 254 of electronic device 102-1 is improved (e.g., in accuracy).

In some embodiments, in accordance with a determination that a wake word is detected in a signal received by microphone 254 of electronic device 102-1, a determination is made regarding whether a voice command is received following the wake word. For example, the signal received by microphone 254 is transmitted by electronic device 102-1 to media content provider server 104 and voice API 108 of media content provider server 104 analyzes the received signal to determine a wake word and/or voice command included in the signal. In some embodiments, electronic device 102-1 analyzes the received signal to determine a wake word. In some embodiments, in accordance with a determination that a wake word is detected in the signal received by microphone 254, electronic device 102-1 proceeds to record and/or transmit to media content provider server 104 audio that is received after detection of the predefined command. In some embodiments, the audio that is received by electronic device 102-1 is recorded and stored at electronic device 102-1. In some embodiments, the audio that is received by electronic device 102-1 is forwarded to voice API 108 of media content provider server 104, and voice API 108 records and stores the audio. For example, the electronic device 102-1 detects (e.g., receives) a wake word, (e.g., "Hey, Spotify") and, in response to detecting the wake word, the electronic device 102-1 transmits to media content provider server 104 audio that is received after detection of "Hey, Spotify," such as a voice command (e.g., "Play," "Pause," "Next track," "Play the song 'Yesterday' in the kitchen," "Play Madonna in the kitchen," etc.).

In some embodiments, electronic device 102-1 locally processes (e.g., using voice recognition module 235 and/or a voice API running on electronic device 102-1) a signal received by microphone 254 to determine whether a wake word has been received. In some embodiments, in accordance with a determination that a wake word has been received, electronic device 102-1 records and/or transmits a signal received by microphone 254 following the wake word to media content provider server 104. In some embodiments, electronic device 102-1 transmits a signal received by microphone 254 to media content provider server 104 and wake word module 318 of media content provider server 104 determines whether a wake word has been received. In some embodiments, in accordance with a determination that a wake word has been received, voice recognition module 316 of media content provider server 104 determines whether a voice command has been received. For example, the voice API 108 (e.g., voice recognition module 316) of media content provider server 104 processes (e.g., parses) the signal received by microphone 254 to identify a media request corresponding to the voice command. In some embodiments, in accordance with a determination that a media request corresponding to the voice command is identified, the media content provider server 104 sends an instruction associated the media request. In some embodiments, the media content provider server 104 sends the instruction to electronic device 102-1 for execution. In some embodiments, the media content provider server 104 sends the instruction to electronic device 102-2. In some embodiments, the media content provider server 104 sends the instruction to CDN 106 (e.g., the media content provider server 104 transmits an instruction to CDN 106 to transmit a media content item to electronic device 102-1 and/or electronic device 102-2).

In some embodiments, an instruction generated by media content provider server 104 includes a target device (e.g., a target device identified in the voice command). For example, in response to receiving a voice command to "Play 'Yesterday' in the kitchen," the media content provider server generates an instruction to initiate playback of the song "Yesterday" at electronic device 102-2 (located in the kitchen). In some embodiments, the media content provider server sends an instruction to a first electronic device (e.g., electronic device 102-1) and the first electronic device sends the instruction to a second electronic device (electronic device 102-2). In some embodiments, the media content provider server 104 sends the command to a plurality of electronic devices and/or CDN 106.

Figure 5:
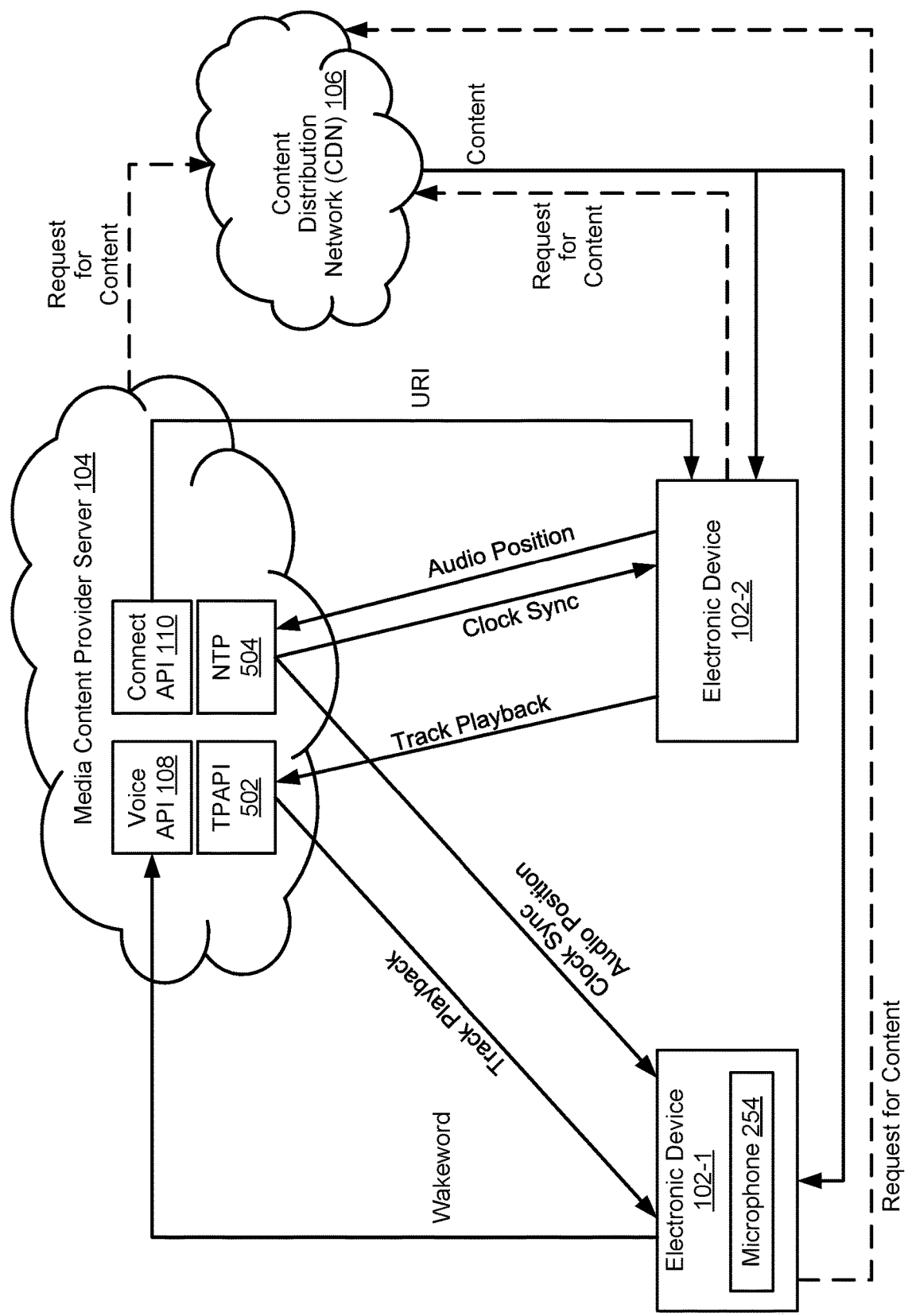
FIG. 5 is a block diagram illustrating a second system architecture for generating a cleaned version of ambient sound, in accordance with some embodiments.

FIG. 5 is a block diagram illustrating a second system architecture for generating a cleaned version of ambient sound, in accordance with some embodiments. In the illustrative example of FIG. 5, information (e.g., track playback, clock sync, and/or audio position) is received from media content provider server 104 and used for subtracting audio corresponding to a media content item playing at electronic device 102-2 from a signal received by a microphone of electronic device 102-1. After performing the subtraction, the detectability of a wake word and/or voice command uttered by a user of electronic device 102-1 is improved (e.g., detected with improved efficiency and/or accuracy). For example, using the cleaned (e.g., subtracted) version of the ambient sound improves the detection of user inputs (e.g., wake words and/or voice commands) by allowing electronic device 102-1 to perform a faster and/or more accurate recognition of the inputs, thus improving the technical performance of electronic device 102-1.

In this architecture, CDN 106 sends content to electronic device 102-1 and to electronic device 102-2. In some embodiments, electronic devices 102-1 and 102-2 receive timing information (e.g., clock sync) from media content provider server 104 (e.g., NTP 504). In some embodiments, electronic device 102-2 transmits audio position information to media content provider server 104 and electronic device 102-1 receives the audio position information to media content provider server 104. In some embodiments, the timing information and/or audio position information are embedded in the media content (e.g., received by electronic device 102-1 and/or electronic device 102-2 from CDN 106). For example, timing information and/or audio position information are encoded as a watermark within the media content item (e.g., within the audio buffer) (e.g., as audio steganography where the information is concealed within the audio file such that a user does not detect a change in the playback of the audio file). For example, electronic device 102-1 and electronic device 102-2 process the audio signal to extract the information that is encoded in the audio signal. In some embodiments, the timing information and/or audio position are encoded at fixed intervals within the media content item.

In some embodiments, a secure communications channel between media content provider server 104 and electronic device 102-2 is established (e.g., as described with reference to FIG. 4). For example, electronic device 102-2 communicates (e.g., over network(s) 114) with media content provider server 104, including a "Connect API" (e.g., Network Communication Module 312) and/or "Key Service" 112 (e.g., Key Database 336). In some embodiments, media content provider server 104, using the Connect API 110, sends a uniform resource identifier (URI) to electronic device 102-2 to establish a connection between media content provider server 104 and electronic device 102-2. In some embodiments, after connecting (via URI) with media content provider server 104, electronic device 102-2 is granted access to media content stored at CDN 106. For example, electronic device 102-2 is able to request and/or receive media content from CDN 106.

In some embodiments, electronic device 102-1 and/or electronic device 102-2 sends a request for media content to media content provider server 104 and/or CDN 106. In response to the request for media content, media content provider server 104 and/or CDN 106 sends the requested content to electronic device 102-1 and electronic device 102-2 (e.g., media content provider server 104 sends an instruction to CDN 106 to send the requested content).

In some embodiments, CDN 106 sends the same content to electronic device 102-1 and electronic device 102-2. In some embodiments, CDN 106 sends a compressed (e.g., smaller) version of content to electronic device 102-1 and an uncompressed (e.g., larger and/or at least partially uncompressed) version of the content to electronic device 102-2. In some embodiments, the compressed version of the media content item has a lower bitrate than the uncompressed version of the media content item. For example, electronic device 102-2 receives the uncompressed version of the content such that electronic device 102-2 is enabled to present a high definition (e.g., high bitrate, such as 320 kbit/second) version of the media content item. Electronic device 102-1 decodes the compressed version (e.g., with a lower bitrate, such as 96 kbit/second) of the content to determine audio signals (e.g., to be subtracted) corresponding to a current playback position of the media content playing at electronic device 102-2. Transmitting a compressed version of the content to electronic device 102-1 reduces the bandwidth consumed by transmission of the content, while providing sufficient information to allow electronic device 102-1 to determine (e.g., using a clock sync) a current playback position of media content and the audio signals of the media content (e.g., for the current playback position) playing at electronic device 102-2. By determining a current playback position and the audio signals of media content playing at electronic device 102-2, electronic device 102-1 is enabled to generate a signal (e.g., corresponding to the decoded compressed version of the audio) for subtracting the media content playing at electronic device 102-2 from a signal detected by microphone 254 of electronic device 102-1.

Electronic device 102-1 receives, via microphone 254, ambient sound. For example, electronic device 102-1 receives audio signals that include voices (e.g., voice command and/or background conversation) and/or media content (e.g., that is playing at electronic device 102-2). In some embodiments, electronic device 102-1 is configured to track (e.g., using clock sync and audio position information) the media content that is playing at electronic device 102-2. Electronic device 102-1 uses the timing information (e.g., to calculate an offset and/or latency between the electronic device 102-1 and electronic device 102-2) and the audio position information related to the media content played back by electronic device 102-2 (e.g., the audio position information received from media content provider server 104) to filter media content audio emitted by electronic device 102-2 from the signal that is received microphone 254 of the electronic device 102-1 (e.g., as described with regard to FIG. 4). For example, the electronic device 102-1 generates a cleaned version of the ambient audio by at least partially removing audio corresponding to the media content item playing at electronic device 102-2 from the ambient audio such that voices are more detectable in the ambient audio that is analyzed by electronic device 102-1.

In some embodiments, electronic device 102-1 receives track playback information, indicating what media content is playing on electronic device 102-2, from media content provider server 104 (e.g., a Track Playback API (TPAPI)). In some embodiments, the track playback information includes data that represents audio signals that are emitted by electronic device 102-2. In some embodiments, electronic device 102-2 transmits, to media content provider server 104 (e.g., TPAPI 502) the track playback information that indicates the media content being played at electronic device 102-2. In some embodiments, the track playback information enables the media content provider server 104 to resolve playback of media content items (e.g., tracks) with electronic devices 102. For example, both electronic device 102-1 and electronic device 102-2 agree on which media content item is playing based on the track playback information received from media content provider server 104. Using the clock sync and audio position information received from media content provider server 104, the electronic device 102-1 performs a subtraction of the audio signals that are emitted by electronic device 102-2 (e.g., as represented by the data in the received track playback) from the ambient sound that electronic device 102-1 receives.

In some embodiments, electronic device 102-1 transmits received audio to a voice API 108 of media content provider server 104 that corresponds to voice recognition module 316, FIG. 3). In some embodiments, electronic device 102-1 processes received audio using voice recognition module 235 before transmitting the audio to voice API 108. For example, electronic device 102-1 performs a subtraction (e.g., using filtering module 237) to generate a cleaned version of the audio and detects a wake word (e.g., using wake word module 236), and the electronic device 102-1 sends the cleaned version of the audio (e.g., the detected wake word and/or the audio (voice command) received after detection of the wake word) to Voice API 108. In some embodiments, voice API 108 is used by media content provider server 104 to detect and/or interpret a wake word and/or a voice command (e.g., as described above with reference to FIG. 4).

Figure 6A:
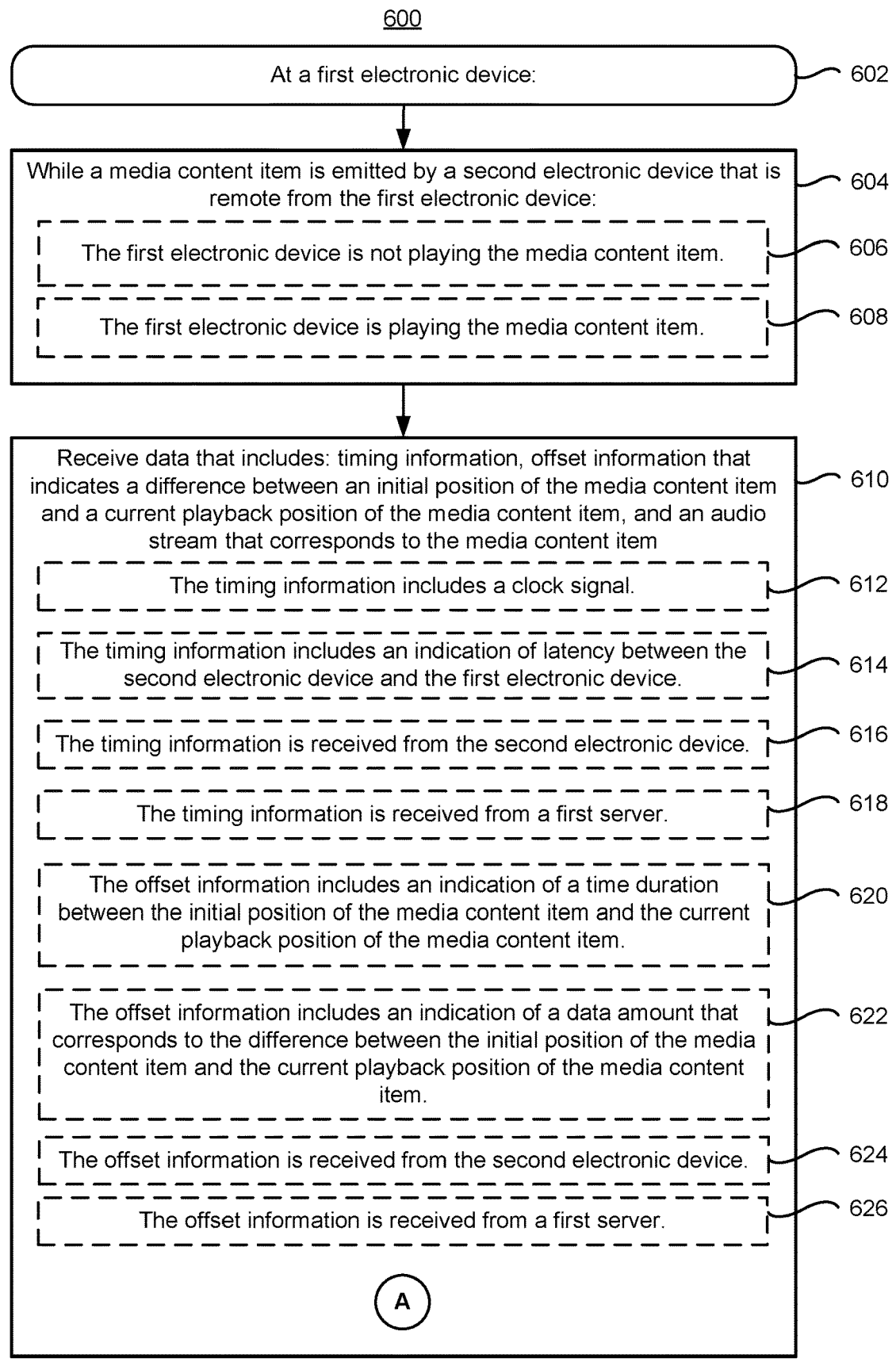
FIGS. 6A-6B are flow diagrams illustrating a method of generating a cleaned version of ambient sound, in accordance with some embodiments.
Figure 6B:
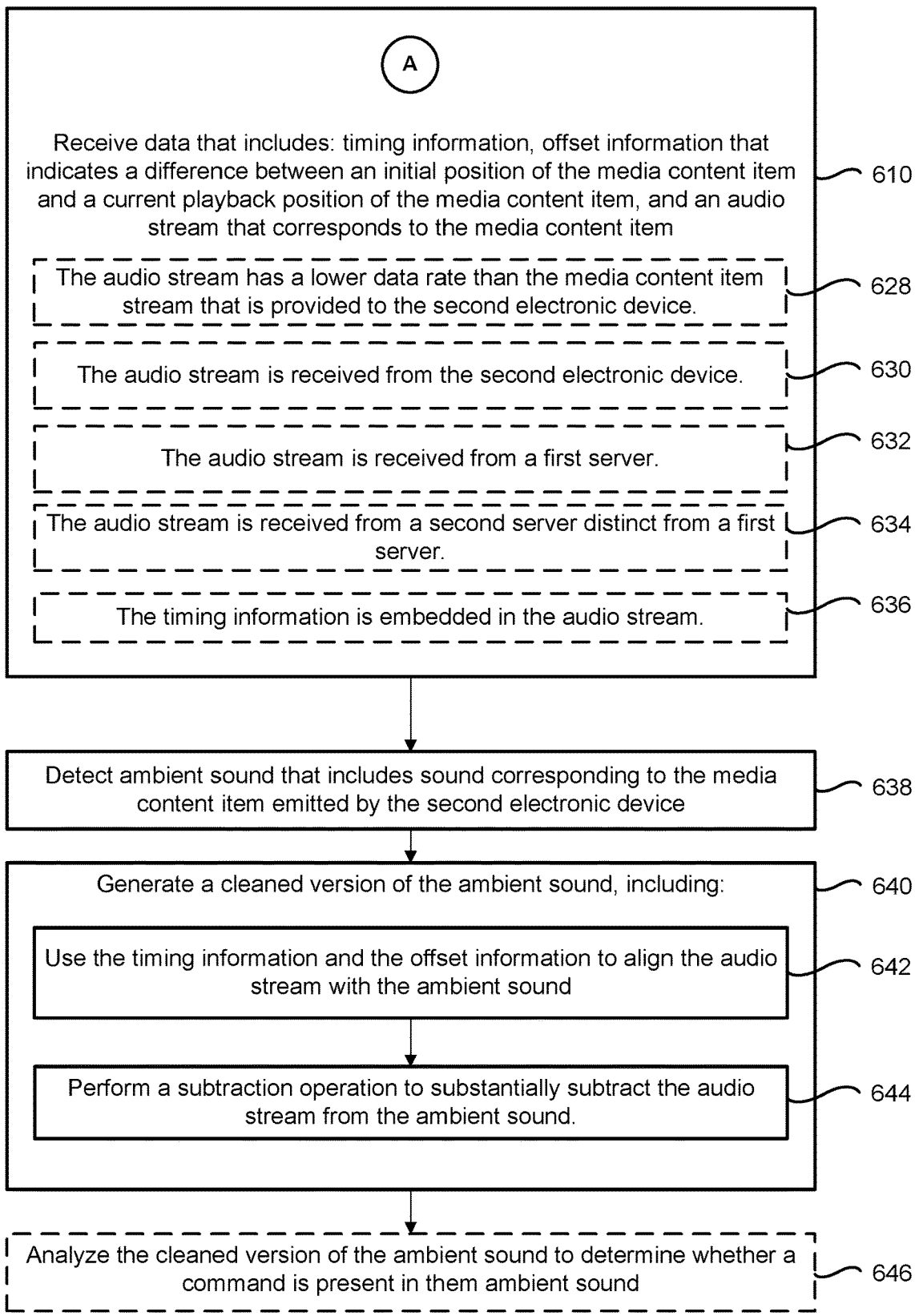

FIGS. 6A-6B are flow diagrams illustrating a method 600 for generating a cleaned version of ambient sound, in accordance with some embodiments. Method 600 may be performed (602) at a first electronic device (e.g., electronic device 102-1), the electronic device having one or more processors and memory storing instructions for execution by the one or more processors. In some embodiments, the method 600 is performed by executing instructions stored in the memory (e.g., memory 212, FIG. 2) of the electronic device. In some embodiments, the method 600 is performed by a combination of the server system (e.g., including media content provider server 104 and/or CDN 106) and an electronic device (e.g., electronic device 102-1). The method 600 provides an improvement in the performance of the first electronic device by improving its ability to detect of user inputs (e.g., wake words and/or voice commands). For example, the electronic device performs a faster and/or more accurate recognition of the inputs on a cleaned version of ambient sound because at least a portion of the noise present in the ambient sound has been detected and removed (e.g., subtracted and/or filtered).

Referring now to FIG. 6A, in performing the method 600, while a media content item is emitted by a second electronic device (e.g., electronic device 102-2) that is remote from the first electronic device (e.g., electronic device 102-1) (604), the first electronic device receives (610) data that includes timing information (e.g., clock sync, FIGS. 4 and 5), offset information (e.g., audio position, FIGS. 4 and 5) that indicates a difference between an initial position of the media content item and a current playback position of the media content item, and an audio stream (e.g., audio buffer, FIG. 4 and/or track playback, FIG. 5) that corresponds to the media content item. For example, the second electronic device (e.g., electronic device 102-2) is playing the media content item. In some embodiments, the second electronic device 102-2 (e.g., active device) includes a speaker and the first electronic device 102-1 (e.g., master device) includes a microphone. Providing the first electronic device with timing information, offset information and an audio stream that corresponds to the media content item enables the first electronic device to more accurately determine the audio signals that are emitted from the second electronic device (e.g., corresponding to the media content item). The performance of the first electronic device is improved because the first electronic device more quickly determines a current playback position of the media content item using the received information, thus reducing the processing load of the first electronic device.

In some embodiments, the first electronic device is not playing (606) the media content item. For example, as described with reference to FIGS. 4 and 5, a first electronic device (e.g., electronic device 102-1) is not playing the media content item. For example, a second electronic device (e.g., electronic device 102-2) emits the media content item but the first electronic device does not emit the media content item.

In some embodiments, the first electronic device is playing (608) the media content item. For example, first electronic device 102-1 plays the media content item while electronic device 102-2 also plays the media content item. In some embodiments, the first electronic device subtracts the locally played media content item from the ambient sound picked up by the microphone 254 of electronic device 102-1. For example, media content emitted by electronic device 102-1 is filtered out of the audio signal picked up by the microphone 254 of electronic device 102-1 and media content emitted by electronic device 102-2 is filtered out of the audio signal picked up by the microphone 254 of electronic device 102-1 to generate the cleaned version of the ambient sound.

In some embodiments, the timing information includes (612) a clock signal. For example, in some embodiments, the clock signal (e.g., clock synchronization information, also referred to herein as "clock sync") is received from an NTP server (e.g., NTP 504, FIG. 5). In some embodiments, the timing information is sent from NTP server (e.g., NTP 504) to the first electronic device (e.g., electronic device 102-1) and the second electronic device (e.g., electronic device 102-2). In some embodiments, the timing information is used to calculate an offset between a first time at which media content that is playing back at electronic device 102-2 is output by electronic device 102-2 and a second time at which media content that is playing back at electronic device 102-2 is received (e.g., as described with regard to FIG. 4).

In some embodiments, the timing information includes (614) an indication of latency between the second electronic device and the first electronic device. For example, the indication of latency includes a round trip time between the second electronic device (e.g., electronic device 102-2) and the first electronic device (e.g., electronic device 102-1). For example, the timing information is established during a handshaking process between the first electronic device and the second electronic device. In some embodiments, the handshaking process is performed initially, periodically, and/or in response to a request (from either of the electronic devices 102 and/or media content provider server 104).

In some embodiments, the timing information is received (616) from the second electronic device (e.g., electronic device 102-2). For example, during the handshaking process between the first electronic device and the second electronic device, the second electronic device sends, to the first electronic device, the timing information (e.g., as illustrated in FIG. 4). For example, the timing information (e.g., clock sync, FIG. 4) includes a timestamp that indicates a time (e.g., in a universal time code (UTC)) that is currently stored at electronic device 102-2.

In some embodiments, the timing information is received (618) from a first server (e.g., an network time protocol (NTP) server). For example, the clock synchronization signal is received from media content provider server 104 (e.g., as illustrated in FIG. 5).

In some embodiments, the offset information includes (620) an indication of a time duration between the initial position of the media content item and the current playback position of the media content item. For example, electronic device 102-2 transmits to electronic device 102-1 an indication of a time duration between the start of a media content item playing at electronic device 102-2 and a current playback position of the media content item playing at electronic device 102-2. For example, as described with regard to FIG. 4, an audio position is sent from electronic device 102-2 to electronic device 102-1.

In some embodiments, the offset information includes (622) an indication of a data amount that corresponds to the difference between the initial position of the media content item and the current playback position of the media content item (e.g., a byte offset as described with reference to FIG. 4).

In some embodiments, the offset information is received (624) from the second electronic device (e.g., electronic device 102-2). In some embodiments, the offset information and the timing information are received from the second electronic device. For example, as illustrated in FIG. 4, the offset information (e.g., audio position) and timing information (e.g., clock synchronization) are sent from the second electronic device 102-2 to the first electronic device 102-1.

In some embodiments, the offset information is received (626) from a first server (e.g., media content provider server 104). For example, the timing information and the offset information are received from the first server. For example, as illustrated in FIG. 5, the timing information (e.g., clock synchronization) and offset information (e.g., audio position) are received, by the first electronic device 102-1 and by the second electronic device 102-2, from media content provider server 104.

In some embodiments, the audio stream has (628) a lower data rate than the media content item stream that is provided (e.g., by the first server or the second server) to the second electronic device. This improves the performance of the system 100 by decreasing the bandwidth used to provide the audio stream. For example, the media content (e.g., audio buffer) received by the first electronic device 102-1 is a compressed version (e.g., a lower bitrate version) of the media content received by the second electronic device 102-2 from CDN 106. For example, as described with reference to FIG. 4, electronic device 102-2 compresses the media content received from CDN 106 and sends, to electronic device 102-1, the compressed version of the media content (e.g., in an audio buffer). In some embodiments, the processing load of electronic device 102-1 is reduced by only processing (e.g., decoding) a portion of the received compressed version of the media content. For example, the first electronic device determines which portion of the compressed version to decode based on the received timing information and offset information.

In some embodiments, the audio stream is received (630) from the second electronic device. For example, as shown in FIG. 4, the second electronic device 102-2 sends an audio buffer to the first electronic device 102-1.

In some embodiments, the audio stream is received (632) from a first server (or CDN) (e.g., as shown in FIG. 5). For example, in some embodiments, the audio stream is received from media content provider server 104. In some embodiments, the first server (e.g., media content provider server 104) includes CDN 106 and the audio stream is received from the media content provider server 104.

In some embodiments, the audio stream is received (634) from a second server distinct from a first server. For example, as shown in FIG. 5, the audio stream (e.g., content) is received by the electronic devices 102 from CDN 106. In some embodiments, CDN 106 is distinct from the first server (e.g., media content provider server 104). As explained above, in some embodiments, media content provider server 104 sends an instruction to CDN 106 that causes CDN 106 to send the audio stream to the electronic devices 102.

In some embodiments, the timing information is embedded (636) in the audio stream. For example, timing and/or offset indication is encoded as a watermark that is superimposed over the audio stream such that it is acoustically masked by the audio stream.

The first electronic device detects (638) ambient sound that includes sound corresponding to the media content item emitted by the second electronic device. For example, the ambient sound received by a microphone of the first electronic device (e.g., microphone 254 of electronic device 102-1) includes background noise (e.g., voices, external sources of sound) and sound output by the second electronic device (e.g., electronic device 102-2) playing the media content item.

The first electronic device generates (640) a cleaned version of the ambient sound, including: using the timing information and the offset information to align (642) the audio stream with the ambient sound and performing (644) a subtraction operation to substantially subtract the audio stream from the ambient sound. For example, as explained with reference to FIGS. 4 and 5, electronic device 102-1 uses the timing information to determine, for a respective time period, which portion of the audio stream is output by speaker 252 electronic device 102-2 in order to identify corresponding signals in the ambient sound picked up by the microphone 254 of electronic device 102-1. Generating the cleaned version of the ambient sound improves the detection of user inputs (e.g., wake words and/or voice commands) at the electronic device 102-1. Electronic device 102-1 is enabled to perform a faster and/or more accurate recognition of the inputs.

In some embodiments, the electronic device 102-1 uses the offset information (e.g., determined from clock sync and/or audio position) to determine a difference in time between when the electronic device 102-2 outputs the audio stream and when the electronic device 102-1 receives the audio stream. The electronic device 102-1 uses the timing information and offset information to time-align the audio signal received by electronic device 102-1 with the audio emitted by the speaker of electronic device 102-2 (e.g., based on the offset). Using the offset information improves the cleaned version of the ambient sound by more accurately aligning the audio signal with the audio emitted by the speaker. The electronic device is enabled to more accurately subtract the audio emitted by the speaker from the audio signal and generate a cleaner version of the ambient sound. A cleaner version of the ambient sound further improves the detection of user inputs (e.g., wake words).

In some embodiments, the first electronic device uses acoustic echo cancellation (AEC) to generate the cleaned version of the ambient sound.

For example, the electronic device 102-1 receives, during a first time period, ambient sound. The ambient sound includes the audio signal output by electronic device 102-2. Based on the determined time-alignment (e.g., for the first time period), the first electronic device determines which portion of the audio stream (e.g., that is output by the second electronic device) is received within the ambient sound during the first time period. The electronic device 102-1 subtracts (e.g., using a digital signal processor), from the ambient sound, the determined portion of the audio stream for the first time period to generate a clean version of the ambient sound. After subtracting the determined portion of the audio stream for the first time period, the audio stream output by the second electronic device is at least partially removed from the ambient sound to generate the cleaned version of the ambient sound.

In some embodiments, the electronic device analyzes (646) the cleaned version of the ambient sound to determine whether a command is present in them ambient sound. For example, electronic device 102-1, after generating the cleaned version of the ambient sound, analyzes the cleaned version of the ambient sound to detect a voice command, such as a wake word. As explained above, the processing power of the electronic device is improved by allowing the electronic device to more quickly and more accurately recognize (e.g., analyze) voice commands.

In some embodiments, the electronic device sends, to a first server (e.g., media content provider server 104) an indication that the command is present in the ambient sound. For example, the electronic device 102-1 forwards the cleaned version of the ambient sound to media content provider server 104 (e.g., voice API 108). Media content provider server 104 is better enabled to parse the cleaned version of the ambient sound, identify the command, and cause one or more electronic devices to execute the identified command. For example, as described with regard to FIGS. 4 and 5, Voice API 108 receives a cleaned version of the ambient sound (e.g., including a wake word and/or voice command) from electronic device 102-1, and the media content provider server 104 processes the voice command to cause media content provider server 104, electronic device 102-1, electronic device 102-2, and/or CDN 106 to execute the command.

Although FIGS. 6A-6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method performed by a first electronic device, the method comprising:
    while a media content item is emitted by a second electronic device that is remote from the first electronic device:
        receiving data that includes:
            timing information,
            offset information that indicates a difference between an initial position of the media content item and a current playback position of the media content item, and
            an audio stream that corresponds to the media content item;
        detecting ambient sound that includes sound corresponding to the media content item emitted by the second electronic device; and
        generating a cleaned version of the ambient sound, including:
            using the timing information and the offset information to align the audio stream with the ambient sound; and
            performing a subtraction operation to substantially subtract the audio stream from the ambient sound.

2. The method of claim 1, wherein the timing information includes a clock signal.

3. The method of claim 1, wherein the timing information includes an indication of latency between the second electronic device and the first electronic device.

4. The method of claim 1, wherein the offset information includes an indication of a time duration between the initial position of the media content item and the current playback position of the media content item.

5. The method of claim 1, wherein the offset information includes an indication of a data amount that corresponds to the difference between the initial position of the media content item and the current playback position of the media content item.

6. The method of claim 1, wherein the timing information is received from the second electronic device.

7. The method of claim 1, wherein the timing information is received from a first server.

8. The method of claim 1, wherein the offset information is received from the second electronic device.

9. The method of claim 1, wherein the offset information is received from a first server.

10. The method of claim 1, wherein the audio stream has a lower data rate than the media content item that is provided to the second electronic device.

11. The method of claim 1, wherein the audio stream is received from the second electronic device.

12. The method of claim 1, wherein the audio stream is received from a first server.

13. The method of claim 1, wherein the audio stream is received from a second server distinct from a first server.

14. The method of claim 1, wherein the timing information is embedded in the audio stream.

15. The method of claim 1, including analyzing the cleaned version of the ambient sound to determine whether a command is present in them ambient sound.

16. The method of claim 1, wherein the first electronic device is not playing the media content item.

17. The method of claim 1, wherein the first electronic device is playing the media content item.

18. A first electronic device comprising:
    one or more processors; and
    memory storing instructions for execution by the one or more processors, the instructions including instructions for:
        while a media content item is emitted by a second electronic device that is remote from the first electronic device:
            receiving data that includes:
                timing information,
                offset information that indicates a difference between an initial position of the media content item and a current playback position of the media content item, and
                an audio stream that corresponds to the media content item;
            detecting ambient sound that includes sound corresponding to the media content item emitted by the second electronic device; and
            generating a cleaned version of the ambient sound, including:
                using the timing information and the offset information to align the audio stream with the ambient sound; and
                performing a subtraction operation to substantially subtract the audio stream from the ambient sound.

19. A non-transitory computer-readable storage medium storing instructions for execution by a first electronic device having one or more processors, the instructions including instructions for:
    while a media content item is emitted by a second electronic device that is remote from a first electronic device:
        receiving data that includes:
            timing information,
            offset information that indicates a difference between an initial position of the media content item and a current playback position of the media content item, and
            an audio stream that corresponds to the media content item;

detecting ambient sound that includes sound corresponding to the media content item emitted by the second electronic device; and generating a cleaned version of the ambient sound, including:
  using the timing information and the offset information to align the audio stream with the ambient sound; and
  performing a subtraction operation to substantially subtract the audio stream from the ambient sound.

* * * * *